United States Patent
Park et al.

(10) Patent No.: US 9,787,067 B2
(45) Date of Patent: Oct. 10, 2017

(54) VACUUM CIRCUIT BREAKER

(71) Applicant: LSIS CO., LTD., Gyeonggi-do (KR)

(72) Inventors: Yongi-Ik Park, Gyeonggi-do (KR); Woo-Jin Park, Gyeonggi-do (KR); Kyu-Jung Kim, Gyeonggi-do (KR)

(73) Assignee: LSIS CO., LTD., Gyeonggi-Do (KR)

(*) Notice: Subject to any disclaimer, the term of this patent is extended or adjusted under 35 U.S.C. 154(b) by 0 days.

(21) Appl. No.: 15/133,115

(22) Filed: Apr. 19, 2016

(65) Prior Publication Data
US 2016/0308335 A1    Oct. 20, 2016

(30) Foreign Application Priority Data
Apr. 20, 2015 (KR) .................. 10-2015-0055533

(51) Int. Cl.
*H02B 11/133* (2006.01)
*H02B 11/28* (2006.01)
*H01H 33/666* (2006.01)

(52) U.S. Cl.
CPC ......... *H02B 11/133* (2013.01); *H01H 33/666* (2013.01); *H02B 11/28* (2013.01)

(58) Field of Classification Search
CPC ...... H01H 33/666; H01H 3/30; H02B 11/133; H02B 11/127; H02B 11/28; H02B 11/173
USPC ................................ 218/118, 134, 139, 155
See application file for complete search history.

(56) References Cited

U.S. PATENT DOCUMENTS

| | | | |
|---|---|---|---|
| 4,012,610 A | 3/1977 | Ericson et al. | |
| 5,450,280 A * | 9/1995 | Wactor | H02B 11/26 361/606 |
| 6,445,570 B1 * | 9/2002 | Leccia | H02B 11/133 361/605 |
| 6,545,234 B1 * | 4/2003 | Trivette | H01H 33/666 200/50.21 |
| 7,544,908 B2 * | 6/2009 | Webb | H02B 11/127 200/50.24 |

(Continued)

FOREIGN PATENT DOCUMENTS

| | | |
|---|---|---|
| DE | 3441333 A1 | 9/1985 |
| EP | 0 802 595 A2 | 10/1997 |
| GB | 2 138 635 A | 10/1984 |

(Continued)

OTHER PUBLICATIONS

Translation DE3441333 (Original Doc. published Sep. 26, 1985).*

(Continued)

*Primary Examiner* — Renee Luebke
*Assistant Examiner* — William Bolton
(74) *Attorney, Agent, or Firm* — Nath, Goldberg & Meyer; Jerald L. Meyer

(57) ABSTRACT

Disclosed herein is a vacuum circuit breaker. In some embodiments, a vacuum circuit breaker includes a cradle having a rail which forms a travel route; a main body being movably mounted to the cradle and configured to be in a test position or in an operation position; a wheel traveling along the travel route and configured to move the main body to the test position or the operation position; an interlock plate provided in the main body so as to move together with the main body; and a ground interlock device restraining the movement of the main body by restraining the movement of the interlock plate when grounded.

7 Claims, 6 Drawing Sheets

(56) References Cited

U.S. PATENT DOCUMENTS 8,796,570 B2    8/2014    Kobayashi et al.

FOREIGN PATENT DOCUMENTS

| GB | 2 141 586 A | 12/1984 |
|---|---|---|
| JP | 07046724 A | 2/1995 |
| JP | 11-46410 A | 2/1999 |
| JP | 2001-218315 A | 8/2001 |
| JP | 2007-336763 A | 12/2007 |
| JP | 2008-092669 A | 4/2008 |
| JP | 2008-113525 A | 5/2008 |
| KR | U1999-0034272 A | 1/1998 |
| KR | 10-1158653 B1 | 6/2012 |
| KR | 101486717 B1 | 2/2015 |
| WO | 2008/087746 A1 | 7/2008 |

OTHER PUBLICATIONS

Translation EP0802595 (Original Doc. published Oct. 22, 1997).*
Search report issued in corresponding European application No. 16161376.5-1801 dated Sep. 1, 2016.
Korean Notice of Allowance dated Jul. 8, 2016, in 5 pages.

\* cited by examiner

VACUUM CIRCUIT BREAKER

CROSS REFERENCE TO RELATED APPLICATION

This application claims the benefit of Korean Patent Application No. 10-2015-0055533, filed on Apr. 20, 2015, which is hereby incorporated by reference in its entirety.

BACKGROUND

Technical Field

The present disclosure relates to a vacuum circuit breaker, and more specifically to a vacuum circuit breaker having an interlock device.

Description of the Related Art

Breakers and other electrical equipment are installed in a distributing board for the operation or control of power plants, substations, etc., and for the operation of electrical motors, or the like.

Among these, a vacuum circuit breaker is a device for protecting circuits and equipment which quickly separates circuits by extinguishing the arc which occurs during normal load switching and fault current interruption in a vacuum interrupter.

The vacuum circuit breaker may be divided into a fixed type which is fixedly arranged and a withdrawable type which is withdrawably arranged according to an installation method. The withdrawable type vacuum circuit breaker is widely used because it is convenient for testing and maintenance.

The withdrawable type vacuum circuit breaker is configured to include a switching mechanism for switching circuits, a main body of a circuit breaker including a control device and a terminal represented by an overcurrent relay, and a cradle provided with a terminal which is accessible to an external power source and a load side and connectable to or detachable from a terminal of the main body of the circuit breaker according to the inserting, testing or extracting position of the main body of the circuit breaker.

The withdrawable type vacuum circuit breaker (hereinafter referred to as a vacuum circuit breaker) is generally used, stored inside a vacuum circuit breaker chamber of a distributing board. The vacuum circuit breaker has a different rating depending on the intended use, and, according to each rating, the bus bar shape and size of the main body of the circuit breaker and the cradle and the placement and the distance between respective components may be formed variously.

In the case of performing a short time test for the short time capacity of the vacuum circuit breaker, the fixed state of the main body of the circuit breaker inserted into the cradle may have a significant effect on the test results.

If the fixed state of the main body of the circuit breaker is not stable, the main body of the circuit breaker may move when an electrical current is applied, which generates distortion or vibration to the contact point. It may be the cause of accidents such as fusion or fire.

The related art of the present disclosure is disclosed in Korea Utility Model

Application Publication No. 20-1999-0034272 (Published on 1999 Aug. 25, titled "INTERLOCK APPARATUS FOR VACUUM CIRCUIT BRAKER").

SUMMARY

It is an aspect of some embodiments of the present disclosure to provide a vacuum circuit breaker with a structure improved to restrain the mobility of a main body of a circuit breaker while maintaining the function of a ground interlock device.

In accordance with one aspect of some embodiments of the present disclosure, there is provided a vacuum circuit breaker including: a cradle including a rail which forms a travel route; a main body being movably mounted to the cradle and configured to be in a test position or in an operation position; a wheel traveling along the travel route and configured to move the main body to the test position or the operation position; an interlock plate provided in the main body so as to move together with the main body; and a ground interlock device restraining the movement of the main body by restraining the movement of the interlock plate when grounded, wherein the rail includes: a side plate portion being extended along the travel route and arranged between the interlock plate and the ground interlock device; an evasion portion forming a passage between the interlock plate and the ground interlock device by passing through the side plate portion; a lower rail portion being protruded toward the wheel at the lower part of the side plate portion and rotatably supporting the wheel; and an upper rail portion being formed to protrude in a parallel direction with the lower rail portion at an upper portion of the side plate portion and supporting the wheel at an upper portion of the wheel to restrain the up-and-down directional movement of the wheel when grounded.

The upper rail portion may be extended along the travel route at a regular up-and-down directional interval with the lower rail portion.

The evasion portion may be disposed between the lower rail portion and the upper rail portion; and the lower rail portion and the upper rail portion are provided to have the up-and-down directional interval corresponding to a diameter of the wheel.

The interlock plate may include an engaging portion configured to engage with the main body and a contact portion being protruded from a lower portion of the engaging portion adjacent to the lower rail portion, and wherein a side end portion of the contact portion is blocked by the ground interlock device such that a movement of the interlock plate is restrained when grounded.

The contact portion may be protruded toward the side end portion.

The ground interlock device may include a stopper which is provided to protrude toward the interlock plate and blocks the movement of the interlock plate in contact with the side end of the contact portion in a blocking position when grounded; and a rotation arm which is provided rotatably and is rotated to move the stopper to the blocking position when grounded.

The vacuum circuit breaker may further includes a braking switch which is provided in the main body and operated to stop the movement of the wheel when pressed, and wherein the ground interlock device further includes a pressure plate configured to press the braking switch interlocked with the movement of the stopper moving to the blocking position.

The stopper may be disposed below the pressure plate so as to pass through the evasion portion in the position adjacent to the lower rail portion.

According to the vacuum circuit breaker of some embodiments of the present disclosure, it is possible to effectively prevent the occurrence of the accidents such as fire and fusion of contacts caused by distortion or vibration of a contact portion while maintaining the same function of a ground interlock device because the fixed state of the main body of the circuit breaker remains stable by effectively constraining the up-and-down movement of a wheel when moving the body of the circuit breaker or grounded.

Further, some embodiments of the present disclosure has an effect that the fixed state of the body of the circuit breaker remains more stable through the dual restraint to the movement of the main body, using the brake action on the wheel achieved by the pressurization of the pressure plate to the braking switch with the movement stopping action on the interlock plate achieved by the interaction between the stopper and the contact portion.

DETAILED DESCRIPTION

Figure 1:
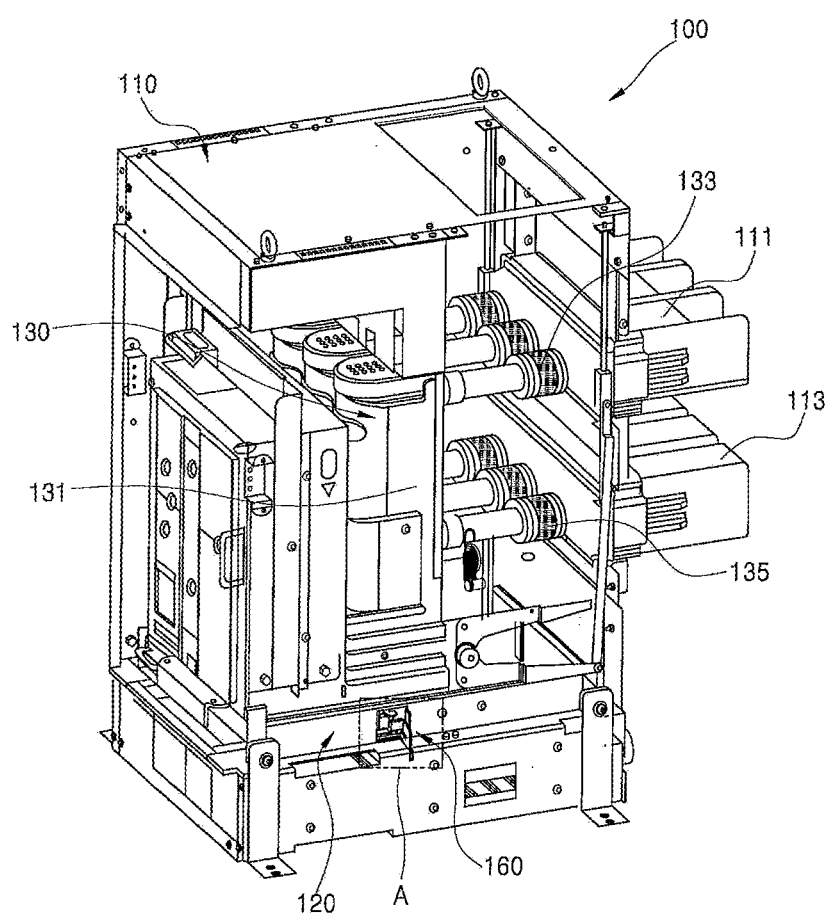
FIG. 1 is a perspective view showing the state of the test position of a vacuum circuit breaker according to an embodiment of the present disclosure.

Hereinafter, an embodiment of a vacuum circuit breaker according to the present disclosure will be described with reference to the accompanying drawings. The thickness of the lines, the size of the components and the like shown in the drawings may be exaggerated for convenience and clarity of description. In addition, terms to be described later are defined in consideration of functions in the present disclosure, thus, the terms may be changed according to the custom or the intention of users or operators. Therefore, definitions of the terms should be made based on the contents throughout the present specification.

Figure 2:
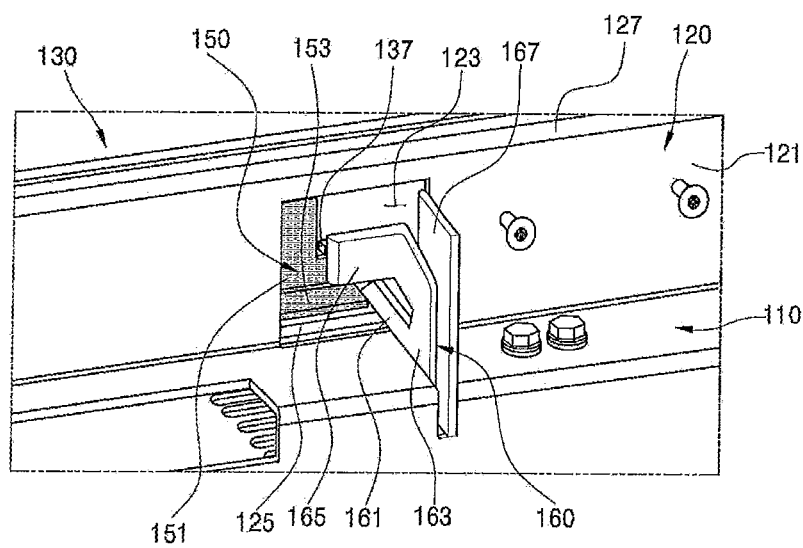
FIG. 2 is a view of an enlarged "A" portion of FIG. 1.
Figure 3:
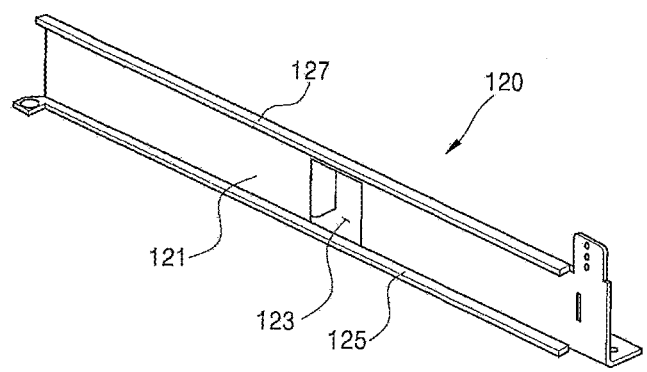
FIG. 3 is a rear perspective view of the rear of a rail according to the embodiment of the present disclosure.
Figure 4:
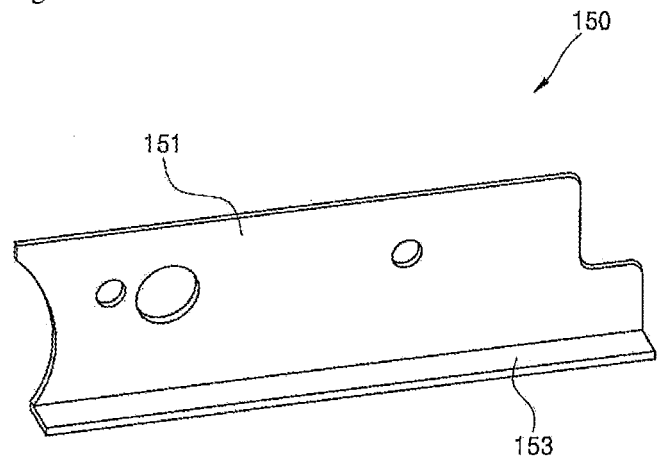
FIG. 4 is a perspective view of an interlock plate according to the embodiment of the present disclosure.
Figure 5:
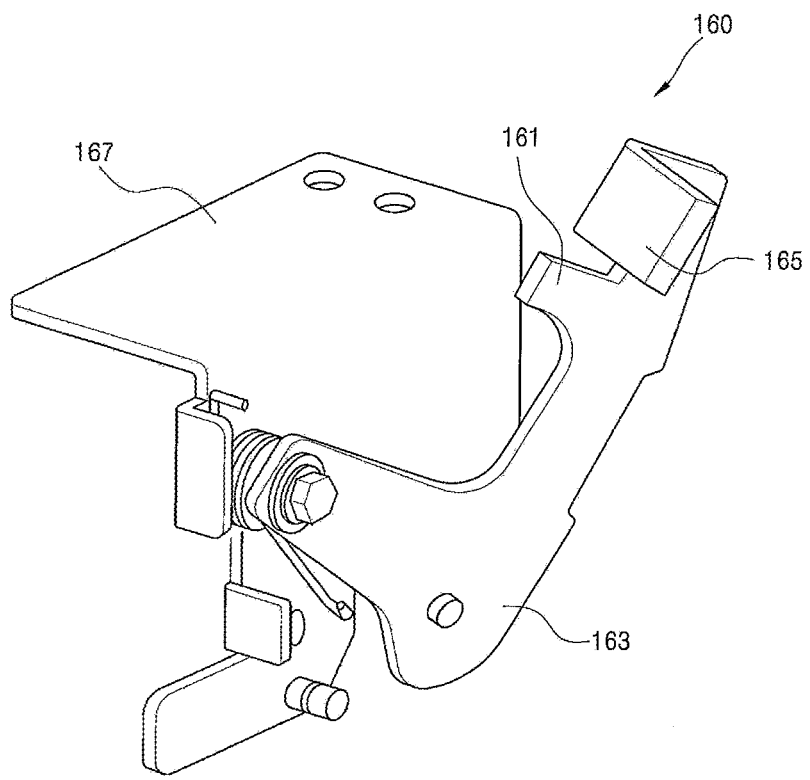
FIG. 5 is a perspective view of a ground interlock device in accordance with the embodiment of the present disclosure.
Figure 6:
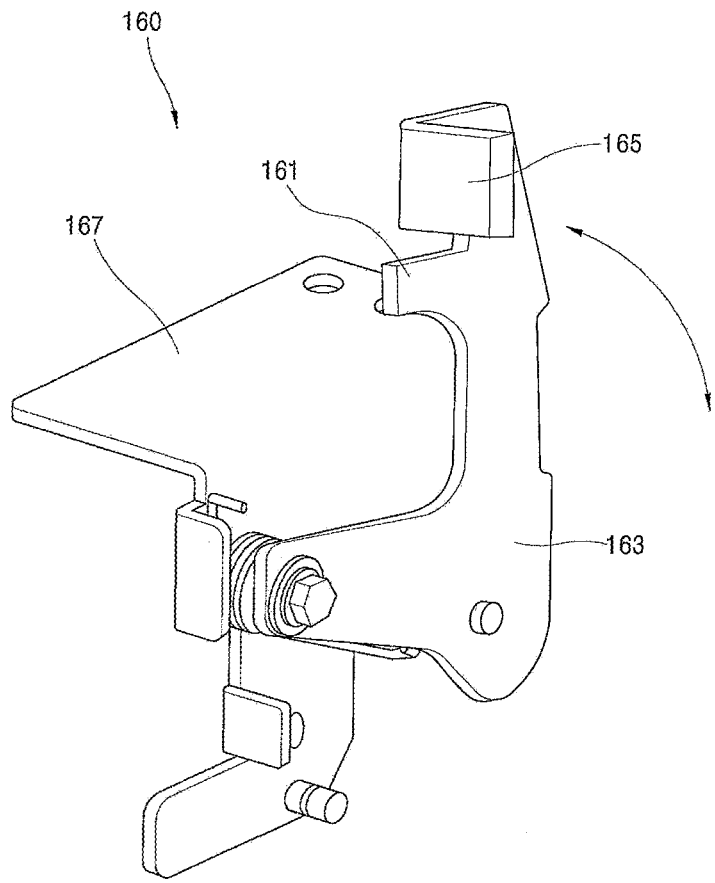
FIG. 6 is a view showing an operating state of the ground interlock device in FIG. 5.
Figure 7:
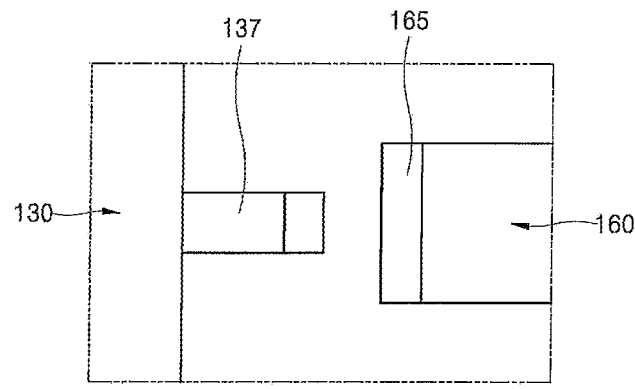
FIG. 7 is a view schematically showing a state of a braking switch in an operation position according to some embodiments of the present disclosure.
Figure 8:
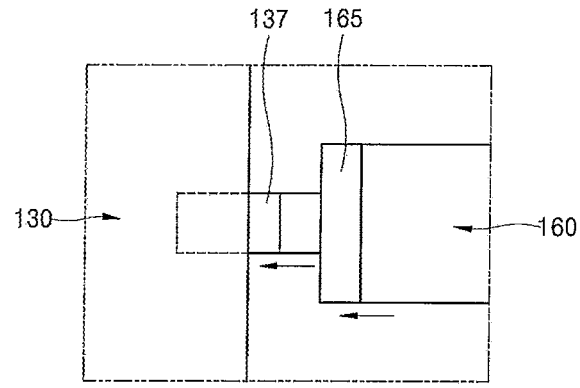
FIG. 8 is a view schematically showing a state of a braking switch in a test position according to some embodiments of the present disclosure.

FIG. 1 is a perspective view showing the state of the test position of a vacuum circuit breaker according to an embodiment of the present disclosure, and FIG. 2 is an enlarged view of an enlarged "A" portion of FIG. 1, and FIG. 3 is a rear perspective view of the rear of a rail according to the embodiment of the present disclosure. In addition, FIG. 4 is a perspective view of an interlock plate according to the embodiment of the present disclosure and FIG. 5 is a perspective view of a ground interlock device in accordance with the embodiment of the present disclosure. In addition, FIG. 6 is a view showing an operating state of the ground interlock device in FIG. 5, and FIG. 7 is a view schematically showing a state of a braking switch in an operation position, and FIG. 8 is a view schematically showing a state of a braking switch in a test position.

Referring to FIGS. 1 and 2, a vacuum circuit breaker 100 according to the embodiment of the present disclosure includes a cradle 110, a main body 130, a wheel 140 (see FIG. 10), an interlock plate 150, and a ground interlock device 160.

The cradle 110 is installed inside a vacuum circuit breaker chamber in a distributing board. A space is made for the main body 130 to be placed inside the cradle 110. In addition, a rail 120 is installed at the bottom surface where the main body 130 is placed.

The rail 120 extends in a moving direction of the main body 130 along which the main body 130 is mounted to the cradle 110. The rail 120 has a length which forms a travel route along the moving direction of the main body 130 while it is installed on the bottom surface of the cradle 110.

As shown in FIGS. 2 and 3, the rail 120 is provided with a side plate portion 121, an evasion portion 123, a lower rail portion 125 and an upper rail portion 127 in the form of a rectangular bracket shape.

The side plate portion 121 is formed into a plate shape extending along the travel route while it is provided between the interlock plate 150 and the ground interlock device 160.

Some region of the side plate portion 121 has the evasion portion 123. The evasion portion 123 forms a passage between the interlock plate 150 and the ground interlock device 160 on the side plate portion 121 by being made to penetrate the side plate portion 121.

Figure 10:
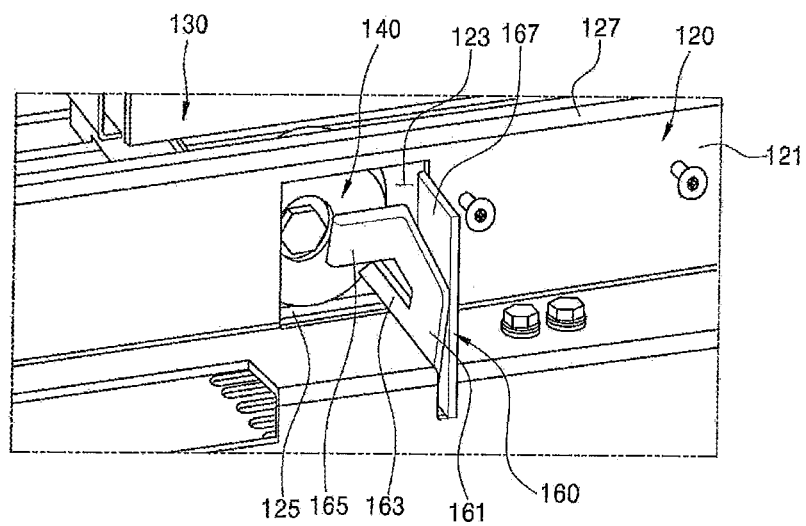
FIG. 10 is a view of an enlarged "B" portion in FIG. 9.

The lower rail portion 125 is protruded toward the wheel 140, that is, an inner direction of the cradle 110 at a lower portion of the side plate portion 121 and rotatably supports the wheel 140 (see FIG. 10).

In addition, the upper rail portion 127 is formed to protrude in a parallel direction to the lower rail portion 125, that is, toward the inner direction of the cradle 110 at the an upper portion of the side plate portion 121 and it supports the wheel 140 at the upper portion so as to restrain the up-and-down directional movement of the wheel 140 when grounded. Detailed description will be described later.

Referring to FIGS. 1 and 2, the main body 130 is provided with vacuum interrupters 131 which correspond to phases of a power source (e.g., three phase). In this embodiment, the main body 130 is illustrated as being of a type having three vacuum interrupters 131 which can open and close the three phase power source, respectively.

The vacuum interrupter 131 operates so as to connect or disconnect a bus bar connection portion 133 and a load connection portion 135, and the bus bar connection portion 133 and the load connection portion 135 may be respectively connected to a bus bar terminal 111 and a load terminal 113 provided in the cradle 110.

The main body 130 is movably placed to a test position which the bus bar connection portion 133 and the load connection portion 135 are separated from the load terminal 113 or an operation position which the bus bar connection portion 133 and the load connection portion 135 can be connected to the bus bar terminal 111 and the load terminal 113, respectively, while it is placed on the cradle 110.

The wheel 140 is arranged at the lower portion of the main body 130. The wheel 140 moves the main body 130 to the test position or the operation position, traveling along the travel route formed by the rail 120.

According to an embodiment, the wheel 140 travels in the rail with inserted between the lower rail portion 125 and the upper rail portion 127.

Further, the rail 120 is formed into a shape which extends to maintain a constant up-and-down directional interval between the upper rail portion 127 and the lower rail portion 125. At this point, the lower rail portion 125 and the upper rail portion 127 are formed to have the up-and-down directional interval corresponded to a diameter of the wheel 140, interposing the evasion portion 123 between them.

In other words, the rail 120 is provided to engage the wheel 140 between the lower rail portion 125 and the upper rail portion 127, thereby can restrain the up-and-down directional movement of the wheel 140.

Further, even in the section of the rail 120 where the evasion portion 123 is formed, the up-and-down directional interval between the lower rail portion 125 and the upper rail portion 127 is maintained to be corresponded to the diameter of the wheel 140.

Accordingly, the up-and-down directional movement of the wheel 140 is restrained stably even in the section where the evasion portion 123 is formed.

In this way, the up-and-down directional movement of the wheel 140 is stably restrained by the rail 120, which prevents the main body 130 from moving when an electrical current is applied. This prevents the occurrence of the accidents such as fire and fusion of contact points caused by the movement of the main body 130 effectively.

The interlock plate 150 is installed in the main body 130 so as to move together with the main body 130. The interlock plate 150 includes an engaging portion 151 and a contact portion 153, as shown in FIGS. 2 and 4.

The engaging portion 151 is formed into a plate shape extending along the travel route of the wheel 140, that is, the moving direction of the main body 130, and engages with the main body 130.

In addition, the contact portion 153 is formed to protrude from the lower side of the engaging portion 151 adjacent to the lower rail portion 125. The contact portion 153 is arranged to protrude toward the side plate 121 of the rail 120.

Thus, the side cross section of the interlock plate 150 has an "L" shape of which the lower side protrudes toward the side plate 121.

In the interlock plate 150 formed as described above, a side end portion of the contact portion 153 is stuck by the ground interlock device 160 when grounded, thereby the movement of the interlock plate 150 is prevented and the movement of the main body 130 where the interlock plate 150 is provided is also prevented.

The ground interlock device 160 stops the movement of the main body 130 by stopping the movement of the interlock plate 150 when grounded.

When working for inspection and maintenance of the distributing board or lines, it is necessary to disconnect the connection between the bus bar connection portion 133 and the load connection portion 135 and the connection between the bus bar terminal 111 and the load terminal 113 and to remove the voltage remaining in the load. To do this, first, the main body 130 is moved to the test position and the load side is referenced to the ground.

The load side is referenced to the ground only when the main body 130 is in the test position. If the load side is referenced to the ground when the main body 130 is in the operation position or during the way to move to the operation position, serious accidents may be caused.

The ground interlock device 160 is provided to block the movement of the main body 130 so that the main body 130 may not move to the operation position when grounded, and it includes a stopper 161 and a rotation arm 163, as shown in FIGS. 2 and 5.

The stopper 161 is provided to protrude toward the interlock plate 150 from the rotation arm 163. The stopper 161 blocks the movement of the interlock plate 150 in contact with the side end of the contact portion 153 at a blocking position when grounded.

In addition, the rotation arm 163 can make a rotational motion and the stopper 161 is transferred to the blocking position by the rotation of the rotation arm 163 when grounded.

According to some embodiments of the present embodiment, one side of the rotation arm 163 is rotatably coupled to a main body 167 combined on the cradle 110, and the stopper 161 is formed to protrude toward the interlock plate 150 at the other side of the rotation arm 163 extended from one side of the rotation arm 163.

The stopper 161 formed at the other side of the rotation arm 163 as described above can be moved into the blocking position or out of the blocking position by the rotation of the rotation arm 163 about one side of the rotation arm 163.

In some embodiments, the blocking position is the position of the stopper 161 where the stopper 161 can block the movement of the interlock plate 150.

The other side of the rotation arm 163 can be rotated in the direction close to or away from the interlock plate 150. In addition, the stopper 161 can be moved into the blocking position by moving in the closer direction to the interlock plate 150 or out of the blocking position by moving in the leaving direction from the interlock plate 150 by the rotation of the rotation arm 163.

At this time, the rotation of the rotation arm 163 as described above may be performed by the operation signal or the power which is transmitted to operate the ground switch (not shown) for grounding, and the operation of the ground switch may be interlocked with the rotation of the rotation arm 163.

The stopper 161 provided movably as described above can block the movement of the interlock plate 150 by being contacted and interrupted with the side end portion of the contact portion 153 at the blocking position, and it can release the restriction of the movement of the interlock plate 150 by moving away from the blocking position and releasing the contact and the interruption with the side end portion of the contact portion 153.

On the other hand, the vacuum circuit breaker 100 according to some embodiments may further include a braking switch 137, as shown in FIGS. 2 and 7. The braking switch 137 is provided in the main body 130 and is operated to stop the movement of the wheel 140 when pressed.

In addition, the ground interlock device 160 may further include a pressure plate 165 to operate the braking switch 137. The pressure plate 165 is moved interlocked with the rotation of the rotation arm 163. The pressure plate 165 moves together with the stopper 161 which moves to the blocking position and presses the braking switch 137, thereby the pressure plate 165 operates the braking switch 137.

In other words, when the stopper 161 moves into the blocking position so as to stop the movement of the interlock plate 150, the pressure plate 165 also moves together with it and presses the braking switch 137 to operate the braking switch 137. As a result, the action of the stopper 161 for stopping the movement of the interlock plate 150 occurs with the action of the braking switch 137 for stopping the movement of the wheel 140.

This enables the movement of the main body 130 to be more reliably restrained when grounded because the dual braking action for stopping the movement of the main body 130 acts on the main body 130.

Further, the stopper 161 and the pressure plate 165 pass through a passage formed in the rail, that is, the evasion portion 123 when moving to the blocking position, as shown in FIGS. 2 and 6.

The stopper 161 and the pressure plate 165 are formed in the other side of the rotation arm 163. In addition, the place in which the stopper 161 and the pressure plate 165 are provided in the rotation arm 163 is determined to be within the range where the moving route of the stopper 161 and the pressure plate 165 moved by the rotation of the rotation arm 163 can pass through the evasion portion 123.

In other words, the up-and-down directional position of the stopper 161 and the pressure plate 165 in the rotation arm 163 is determined to meet that an up-and-down directional gap therebetween is within the up-and-down directional interval between the lower rail side portion 125 and the upper rail side portion 127 which is formed at a regular interval corresponding to the diameter of the wheel 140 when passing through the area where the rail 120 is located.

If the stopper 161 and the pressure plate 165 are provided to pass through the rail 120 at a location deviated from the interval between the lower rail portion 125 and the upper rail portion 127 formed as described above, a height of the evasion portion 123 which is a height of a passage that the stopper 161 and the pressure plate 165 pass through needs to be increased.

As a result, in the area where the evasion portion 123 is formed, the interval between the lower rail portion 125 and the upper rail portion 127 increase with a width greater than the diameter of the wheel 140 or it is impossible to form the upper rail portion 127, and thus the up-and-down directional movement of the wheel 140 cannot be restrained.

In comparison, in some embodiments, the interval between the lower rail portion 125 and the upper rail portion 127 can be formed at regular interval corresponding to the diameter of the wheel 140 even in the area where the evasion portion 123 is formed, by narrowing the rotating radius of the entire ground interlock device 160 in such a way that the stopper 161 and the pressure plate 165 are made to be formed in the position which can pass through the evasion portion 123 without deviating from the area between the lower rail portion 125 and the upper rail portion 127.

Preferably, the stopper 161 may be located below the pressure plate 165. It is to narrow the rotating radius of the entire ground interlock device 160 provided with the stopper 161 and the pressure plate 165 more effectively, by locating the more protruded portion at the lower side in consideration of the stopper 161 protruded than the pressure plate 165.

Figure 9:
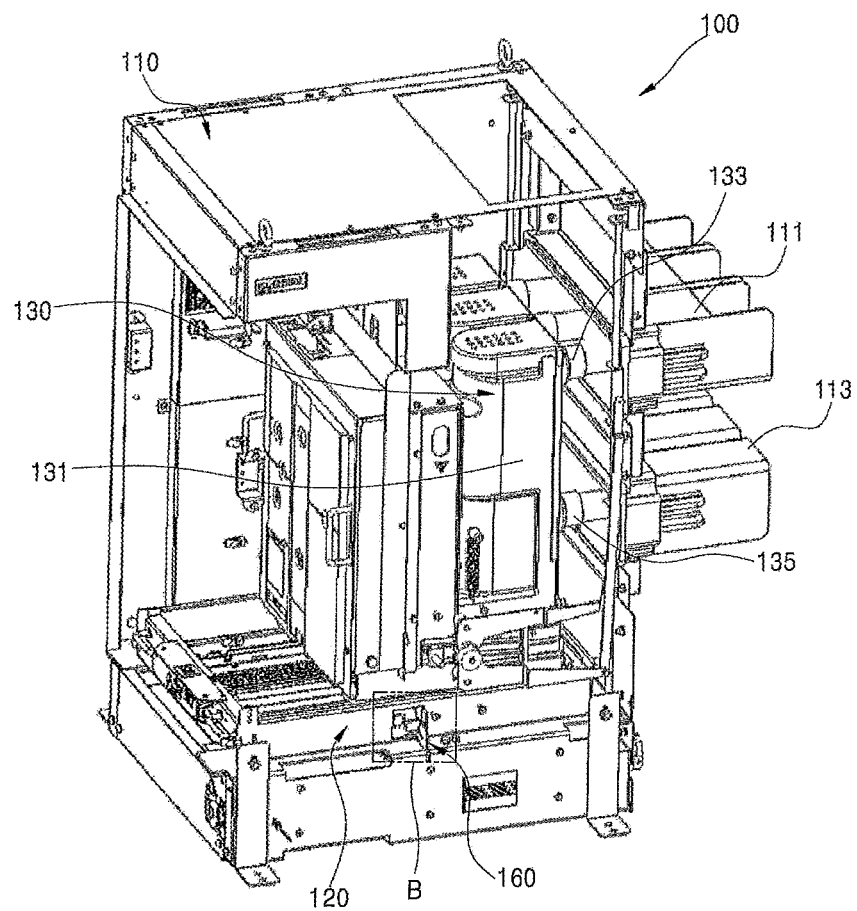
FIG. 9 is a perspective view showing a state of the operation position of the vacuum circuit breaker according to the embodiment of the present disclosure.

In addition, FIG. 9 is a perspective view showing a state of the operation position of the vacuum circuit breaker according to an embodiment of the present disclosure and FIG. 10 is an enlarged view of an enlarged "B" portion in FIG. 9.

The following describes the operation and the effect of the vacuum circuit breaker according to some embodiments with reference to FIGS. 1 to 10.

As shown in FIGS. 9 and 10, when the main body of the circuit breaker 130 is arranged to the cradle 110 to be located in the operation position, the bus bar connection portion 133 and the load connection portion 135 as well as the bus bar terminal 111 and the load terminal 113 are connected, respectively.

In addition, when working for the inspection and maintenance of the distributing board or lines, as shown in FIGS. 1 and 2, the main body 130 is moved to the test position, which causes the disconnecting between the terminals 111, 113 and the connection portions 133, 135.

In this state, if the ground switch is operated for ground, the movement of the interlock plate 150 is blocked by the operation of the ground interlock device 160, whereby the main body 130 is prevented from moving and it is fixed on the cradle 110 so that it cannot move to the operation position.

In this process, as shown in FIGS. 2 and 6, the ground interlock device 160 is operated in the form of stopping the movement of the wheel 140 by operating the braking switch 137 using the pressure plate 165 moved toward the main body 130 together with the stopper 161 while stopping the movement of the interlock plate 150 by moving the stopper 161 to the blocking position and contacting with the side end of the contact portion 153.

Thus, since the movement of the main body 130 is blocked doubly, it is more effectively restrained that the main body 130 moves to the operation position when grounded. Further, in the process, the contact between the contact portion 153 and the stopper 161 is achieved at the lower side of the interlock plate 150 adjacent to the lower rail portion 125, which narrows the rotating radius of the entire ground interlock device 160 for moving the stopper 161 to the blocking position. This allows the travel route of the stopper 161 and the pressure plate 165 to pass through the evasion portion 123 without deviating from the range between the lower rail portion 125 and the upper rail portion 127.

Accordingly, since the intervals between the lower rail portion 125 and the upper rail portion 127 can be formed at the regular interval corresponding to the diameter of the wheel 140 even in the area where the evasion portion 123 is formed, the up-and-down directional movement of the wheel 140 is effectively restrained when the main body 130 is grounded and also when moved.

In some embodiments as described above, the vacuum circuit breaker 100 can effectively prevent the occurrence of the accidents such as fire and fusion of contact points caused by distortion or vibration of the contact portion while maintaining the same function of the ground interlock device 160 because the fixed state of the main body 130 of the circuit breaker 100 remains stable by effectively constraining the up-and-down movement of the wheel 140 when the main body 130 is moved or grounded.

Further, the vacuum circuit breaker 100 of some embodiments has an effect that the fixed state of the main body 130 of the circuit breaker 100 remains more stable by the dual blocking to the movement of the main body 130, using the brake action on the wheel 140 achieved by the pressurization of the pressure plate 165 to the braking switch 137 with the movement stopping action on the interlock plate 150 achieved by the interaction between the stopper 161 and the contact portion 153.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A vacuum circuit breaker comprising:
    a cradle including a rail which forms a travel route;
    a main body being movably mounted to the cradle and configured to be in a test position or in an operation position;
    a wheel traveling along the travel route and configured to move the main body to the test position or the operation position;

an interlock plate provided in the main body so as to move together with the main body; and a ground interlock device restraining a movement of the main body by restraining the movement of the interlock plate when grounded, wherein the rail includes:

a side plate portion being extended along the travel route and arranged between the interlock plate and the ground interlock device;

an evasion portion forming a passage between the interlock plate and the ground interlock device by passing through the side plate portion;

a lower rail portion being protruded toward the wheel at the lower part of the side plate portion and rotatably supporting the wheel; and an upper rail portion being formed to protrude in a parallel direction with the lower rail portion at an upper portion of the side plate portion and supporting the wheel at an upper portion of the wheel to restrain an up-and-down directional movement of the wheel when grounded, wherein the interlock plate includes an engaging portion configured to engage with the main body and a contact portion being protruded from a lower portion of the engaging portion adjacent to the lower rail portion, and wherein a side end portion of the contact portion is blocked by the ground interlock device such that a movement of the interlock plate is restrained when grounded.

2. The vacuum circuit breaker of claim 1, wherein the upper rail portion is extended along the travel route at a regular up-and-down directional interval with the lower rail portion.

3. The vacuum circuit breaker of claim 2, wherein the evasion portion is disposed between the lower rail portion and the upper rail portion; and the lower rail portion and the upper rail portion are provided to have the regular up-and-down directional interval corresponding to a diameter of the wheel.

4. The vacuum circuit breaker of claim 1, wherein the contact portion is protruded toward the side end portion.

5. The vacuum circuit breaker of claim 1, wherein the ground interlock device includes a stopper which is provided to protrude toward the interlock plate and blocks the movement of the interlock plate in contact with the side end of the contact portion in a blocking position when grounded; and a rotation arm which is provided rotatably and is rotated to move the stopper to the blocking position when grounded.

6. The vacuum circuit breaker of claim 5, further comprising a braking switch which is provided in the main body and operated to stop the movement of the wheel when pressed, and wherein the ground interlock device further includes a pressure plate configured to press the braking switch interlocked with the movement of the stopper moving to the blocking position.

7. The vacuum circuit breaker of claim 6, wherein the stopper is disposed below the pressure plate so as to pass through the evasion portion in the position adjacent to the lower rail portion.

* * * * *